United States Patent
Koide et al.

(10) Patent No.: US 10,551,698 B2
(45) Date of Patent: Feb. 4, 2020

(54) DISPLAY DEVICE

(71) Applicant: Japan Display Inc., Minato-ku (JP)

(72) Inventors: Gen Koide, Tokyo (JP); Morikazu Nomura, Tokyo (JP)

(73) Assignee: Japan Display Inc., Minato-ku (JP)

( * ) Notice: Subject to any disclaimer, the term of this patent is extended or adjusted under 35 U.S.C. 154(b) by 43 days.

(21) Appl. No.: 16/006,160

(22) Filed: Jun. 12, 2018

(65) Prior Publication Data

US 2018/0356668 A1 Dec. 13, 2018

(30) Foreign Application Priority Data

Jun. 12, 2017 (JP) .................. 2017-115382

(51) Int. Cl.
| | |
|---|---|
| *G02F 1/1345* | (2006.01) |
| *G02F 1/1333* | (2006.01) |
| *G06F 3/041* | (2006.01) |
| *G06F 3/044* | (2006.01) |
| *G02F 1/1335* | (2006.01) |

(52) U.S. Cl.
CPC ...... *G02F 1/13452* (2013.01); *G02F 1/13338* (2013.01); *G06F 3/044* (2013.01); *G06F 3/0412* (2013.01); *G06F 3/0416* (2013.01); *G02F 1/133512* (2013.01); *G02F 2001/133388* (2013.01); *G02F 2201/56* (2013.01)

(58) Field of Classification Search
CPC ........... G02F 1/13338; G02F 1/133512; G02F 1/13458; G02F 2201/56; G02F 2001/134372; G02F 2001/133388; G02F 1/13454; G02F 1/13452; G02F 2001/13456; G06F 3/0416; G06F 3/0412; G06F 3/044

See application file for complete search history.

(56) References Cited

U.S. PATENT DOCUMENTS

| | | | |
|---|---|---|---|
| 2002/0196393 A1* | 12/2002 | Tashiro | G02F 1/1303 349/106 |
| 2015/0211707 A1 | 7/2015 | Watanabe | |
| 2016/0240157 A1 | 8/2016 | Aoki et al. | |
| 2017/0012243 A1* | 1/2017 | Suzuki | H01L 51/5259 |

FOREIGN PATENT DOCUMENTS

| | | |
|---|---|---|
| JP | 2016-148775 | 8/2016 |
| WO | WO 2014/010463 A1 | 1/2014 |

* cited by examiner

*Primary Examiner* — Muhammad N Edun
(74) *Attorney, Agent, or Firm* — Oblon, McClelland, Maier & Neustadt, L.L.P.

(57) ABSTRACT

According to one embodiment, a display device includes a first substrate including a display area, a terminal area, a first side and a third side, and a second substrate opposed to the first substrate and including a fifth side and a seventh side. The terminal area is sandwiched between the third side and the seventh side. The first substrate includes a first round corner between the first side and the third side. The second substrate includes a third round corner between the fifth side and the seventh side. A radius of curvature of the third round corner is smaller than a radius of curvature of the first round corner.

12 Claims, 8 Drawing Sheets

DISPLAY DEVICE

CROSS-REFERENCE TO RELATED APPLICATIONS

This application is based upon and claims the benefit of priority from Japanese Patent Application No. 2017-115382, filed Jun. 12, 2017, the entire contents of which are incorporated herein by reference.

FIELD

Embodiments described herein relate generally to a display device.

BACKGROUND

A display device such as a liquid crystal display device or an organic electroluminescent display device includes a display area where pixels are aligned and a peripheral area surrounding the display area, and peripheral circuits for driving the pixels are disposed in the peripheral area.

Recently, various technologies of narrowing a frame of the display device have been reviewed. To implement narrowing the frame of the display device, a layout of the peripheral circuits needs to be optimized and the peripheral area needs to be reduced.

BRIEF DESCRIPTION OF THE DRAWINGS

FIG. 6 is a cross-sectional view showing parts of the display device seen along line VI-VI in FIG. 2, illustrating a terminal area, and the like.

DETAILED DESCRIPTION

Figure 1:
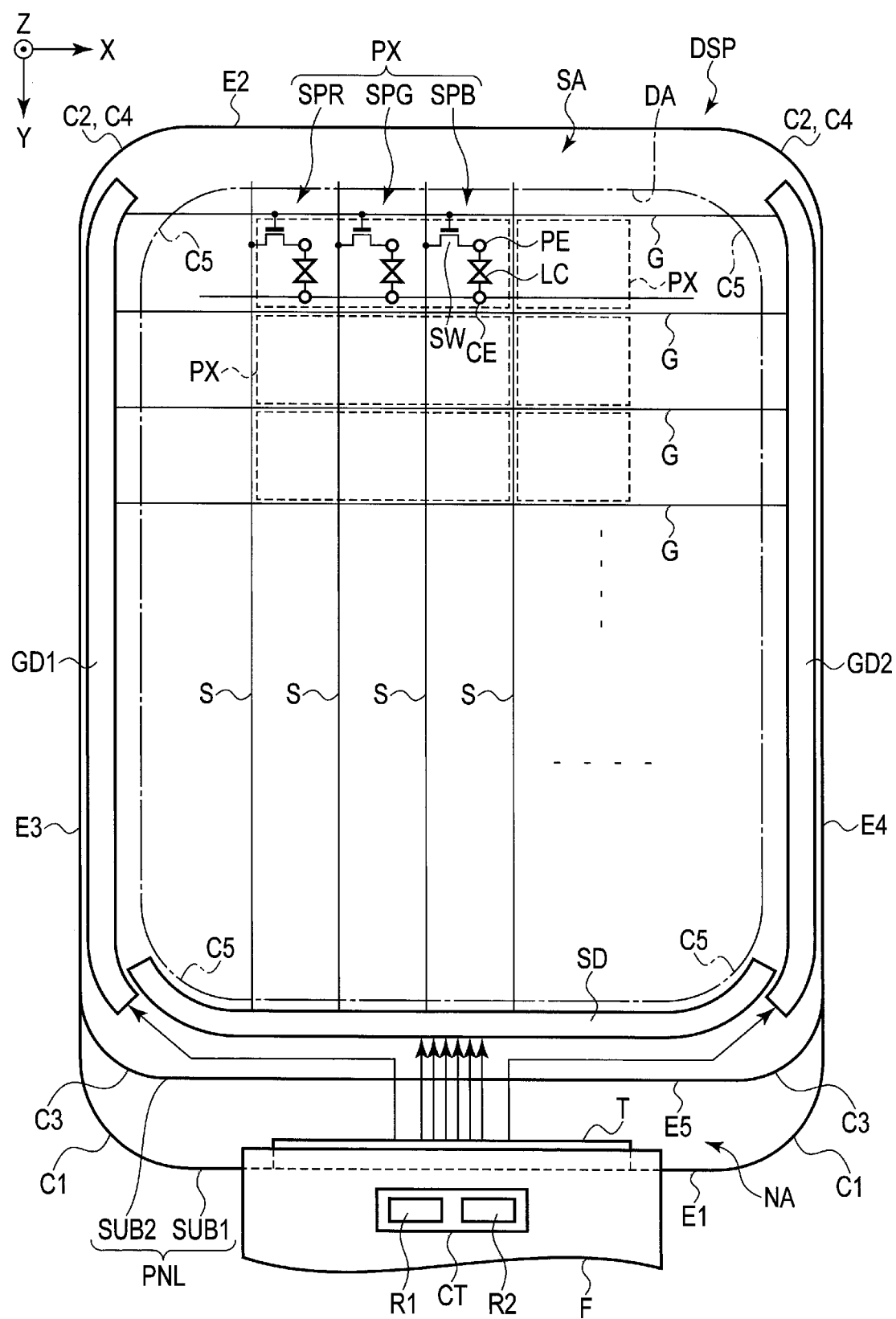
FIG. 1 is a plan view showing a configuration example of a display device according to one of embodiments.

In general, according to one embodiment, a display device, comprising: a first substrate including a display area, a terminal area located outside the display area, a first side extending in a first direction, and a third side extending in a second direction intersecting the first direction; and a second substrate opposed to the first substrate and including a fifth side extending along the first side and a seventh side extending in the second direction, wherein the terminal area is sandwiched between the third side and the seventh side, the first substrate includes a first round corner between the first side and the third side, the second substrate includes a third round corner between the fifth side and the seventh side, and a radius of curvature of the third round corner is smaller than a radius of curvature of the first round corner.

According to another embodiment, a display device, comprising: a first substrate including a display area, a terminal area located outside the display area, and four sides; and a second substrate being opposed to the first substrate and including four sides, wherein the first substrate includes a first curved portion between linear portions of adjacent two sides, the second substrate includes a third curved portion between linear portions of adjacent two sides, one of the linear portions of the first substrate overlaps one of the linear portions of the second substrate, the terminal area is located between the other linear portion of the first substrate and the other linear portion of the second substrate, and the third curved portion is shorter than the first curved portion.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. To more clarify the explanations, the drawings may pictorially show width, thickness, shape and the like of each portion as compared with actual embodiments, but they are mere examples and do not restrict the interpretation of the invention. Furthermore, in the description and figures of the present application, structural elements having the same or similar functions will be referred to by the same reference numbers and detailed explanations of them that are considered redundant may be omitted.

In the embodiments, a liquid crystal display device comprising a touch detecting function will be explained as an example of the display device. The liquid crystal display device can be used for, for example, various devices such as a smartphone, a tablet terminal, a mobile telephone terminal, a notebook computer, a vehicle-mounted device, and a game console. The major configuration disclosed in the embodiments can also be applied to a self-luminous display device such as an organic electroluminescent display device, an electronic paper display device comprising an electrophoretic element, a display device employing the micro-electromechanical system (MEMS), a display device employing the electrochromism, and the like. The configuration concerning the image display disclosed in the embodiments can also be applied to a display device which does not comprise the touch detecting function.

FIG. 1 is a plan view showing a configuration example of a display device DSP according to the embodiments. In the drawing, a first direction X and a second direction Y intersect each other, and a third direction Z intersects the first direction X and the second direction Y. For example, the first direction X, the second direction Y, and the third direction Z are orthogonal to each other but may intersect at an angle other than ninety degrees. In the present specification, a direction forwarding a tip of an arrow indicating the third direction Z is called an upward direction (or, more simply, upwardly) and a direction forwarding oppositely from the tip of the arrow is called a downward direction (or, more simply, downwardly).

The display device DSP comprises a display panel PNL, a circuit board (wiring substrate) F, and a controller CT. The display panel PNL comprises a first substrate SUB1, a second substrate SUB2, and a liquid crystal layer LC disposed between the first substrate SUB1 and the second substrate SUB2 (for more details, see FIG. 3). Furthermore, the display panel PNL includes a display area DA on which an image is displayed and a peripheral area (non-display area) SA located outside the display area DA. In the embodiments, the peripheral area SA is formed in a frame shape surrounding the display area DA.

The display panel PNL includes an end portion E1, an end portion E2 located on a side opposite to the end portion E1 with respect to the display area DA, an end portion E3, an end portion E4 located on a side opposite to the end portion E3 with respect to the display area DA, and an end portion E5 located on a side opposite to the end portion E2 with respect to the display area DA. In the example shown in FIG. 1, the end portions E1, E2, and E5 extend in the first direction X, and the end portions E3 and E4 extend in the second direction Y. Edge portions of the first substrate SUB1 and edge portions of the second substrate SUB2 are aligned at the end portions E2, E3, and E4, respectively, in planar view.

The end portion E1 corresponds to the edge portion of the first substrate SUB1. The end portion E5 corresponds to the edge portion of the second substrate SUB2. The end portion E5 is located on a side closer to the display area DA than to the end portion E1. The display panel PNL has a terminal area NA (or a non-opposition area) where the first substrate SUB1 is not opposed to the second substrate SUB2, between the end portions E1 and E5. The end portions E1, E2, E3, and E4 correspond to four sides of the first substrate SUB1 shaped in a square. The end portions E2, E3, E4, and E5 correspond to four sides of the second substrate SUB2 shaped in a square.

In the first substrate SUB1, the end portion E3 is the first side, the end portion E4 is the second side, the end portion E1 is the third side, and the end portion E2 is the fourth side. In the second substrate SUB2, the end portion E3 is the fifth side, the end portion E4 is the sixth side, the end portion E5 is the seventh side, and the end portion E2 is the eighth side.

The first substrate SUB1 has two corner portions (two first corner portions) C1 located on the terminal area NA side, and two corner portions (two second corner portions) C2. The corner portions C1 and C2 are opposed on diagonal lines of the first substrate SUB1. One of the corner portions C1 is located between the end portions E1 and E3, and the other corner portion C1 is located between the end portions E1 and E4. One of the corner portions C2 is located between the end portions E2 and E3, and the other corner portion C2 is located between the end portions E2 and E4.

The second substrate SUB2 has two corner portions (two third corner portions) C3 located on the terminal area NA side, and two corner portions (two fourth corner portions) C4. The corner portions C3 and C4 are opposed on diagonal lines of the second substrate SUB2. One of the corner portions C3 is located between the end portions E5 and E3, and the other corner portion C3 is located between the end portions E5 and E4. One of the corner portions C4 is located between the end portions E2 and E3, and the other corner portion C4 is located between the end portions E2 and E4. The corner portions C4 overlap the respectively corresponding corner portions C2 in planar view.

The display area DA is shaped in a square, having four sides and four corner portions (four fifth corner portions) C5. In the drawing, a one-dot-chained line represents an outer edge of the display area DA, and the outer edge includes the corner portions C5.

In the example shown in FIG. 1, each of the corner portions C1 to C5 is rounded. For this reason, each of the corner portions C1 to C5 may be called a round portion, a round corner, a curved portion or the like. In the embodiments, each of the corner portions C1 to C5 has an arcuate shape. However, the outer edge of each of the corner portions C1 to C5 does not need to be in an arcuate shape, but may extend along the curve. The outer edges of the corner portions C1 and C2 form parts of an outline of the first substrate SUB1, and the outer edges of the corner portions C3 and C4 form parts of an outline of the second substrate SUB2.

The corner portion C1 is the first round corner (first curved portion), the corner portion C2 is the second round corner (second curved portion), the corner portion C3 is the third round corner (third curved portion), the corner portion C4 is the fourth round corner (fourth curved portion), and the corner portion C5 is the fifth round corner (fifth curved portion).

The display panel PNL comprises scanning lines G and signal lines S, in the display area DA. The scanning lines G extend in the first direction X, and are arranged in the second direction Y and spaced apart from each other. The signal lines S extend in the second direction Y, and are arranged in the first direction X and spaced apart from each other.

Pixels PX arrayed in the first direction X and the second direction Y are located in the display area DA. The pixels PX correspond to areas surrounded by dashed lines in the figure. The pixels PX include sub-pixels SP different in color from one another. For example, the pixel PX includes a red sub-pixel SPR, a green sub-pixel SPG, and a blue sub-pixel SPB. However, the configuration of the pixel PX is not limited to the configuration of the embodiments. For example, the pixel PX may further include a white sub-pixel and the like. The sub-pixel is often simply called a pixel in the present disclosure.

Each of the sub-pixels SP comprises a switching element SW, a pixel electrode PE, and a common electrode CE. For example, the common electrode CE is formed to extend across the sub-pixels SP and is shared by the sub-pixels SP. The switching element SW is electrically connected to the scanning line G, the signal line S, and the pixel electrode PE.

The display panel PNL comprises scanning line drivers GD1 and GD2 to which the scanning lines G are connected, and a signal line driver SD to which the signal lines S are connected, in the peripheral area SA. The scanning line driver GD1 is disposed between the display area DA and the end portion E3, and the scanning line driver GD2 is disposed between the display area DA and the end portion E4. The signal line driver SD is disposed between the display portion DA and the end portion E5. Either of the scanning line drivers GD1 and GD2 may not be disposed.

In the example shown in FIG. 1, the scanning line driver GD1 is provided in an area which is curved in an arcuate shape similarly to the corner portion C5, at a position close to the corner portion C5 on the end portion E3 side. The scanning line driver GD2 is provided in an area which is curved in an arcuate shape similarly to the corner portion C5, at a position close to the corner portion C5 on the end portion E4 side. The signal line driver SD is provided in an area which is curved in an arcuate shape similarly to the corner portion C5, at a position close to the corner portion C5 on the terminal area NA side. An end portion of the signal line driver SD at the position close to the lower left corner portion C5 is located between the scanning line driver GD1 and the display area DA. An end portion of the signal line driver SD at the position close to the lower right corner portion C5 is located between the scanning line driver GD2 and the display area DA.

The scanning line drivers GD1 and GD2 supply scanning signals to the scanning lines G to drive the scanning lines G. The signal line driver SD supplies the video signals to the signal lines S to drive the signal lines S. If the scanning signal is supplied to the scanning line G corresponding to a certain switching element SW and the video signal is supplied to the signal line S connected to this switching element SW, a voltage corresponding to this video signal is applied to the pixel electrode PE. In contrast, a voltage corresponding to a DC common signal (common voltage) is applied to the common electrode CE. At this time, an alignment state of the liquid crystal molecules of the liquid crystal layer LC is varied in accordance with the electric field generated between the pixel electrode PE and the common electrode CE. An image is displayed in the display area DA by this operation.

A connection terminal group T is provided along the end portion E1 in the terminal area NA. The connection terminal group T includes connection terminals aligned along the end portion E1. The circuit board F is connected to the connection terminal group T. In the example shown in FIG. 1, the controller CT is mounted on the circuit board F. The controller CT comprises a display driver R1 which controls the scanning line drivers GD1 and GD2 and the signal line driver SD, and a detection driver R2 for touch detection. Mounting the display driver R1 and the detection driver R2 is not limited to the embodiments. For example, the display driver R1 and the detection driver R2 may be mounted on the first substrate SUB1. In addition, the display driver R1 and the detection driver R2 may be mounted on different members.

Figure 2:
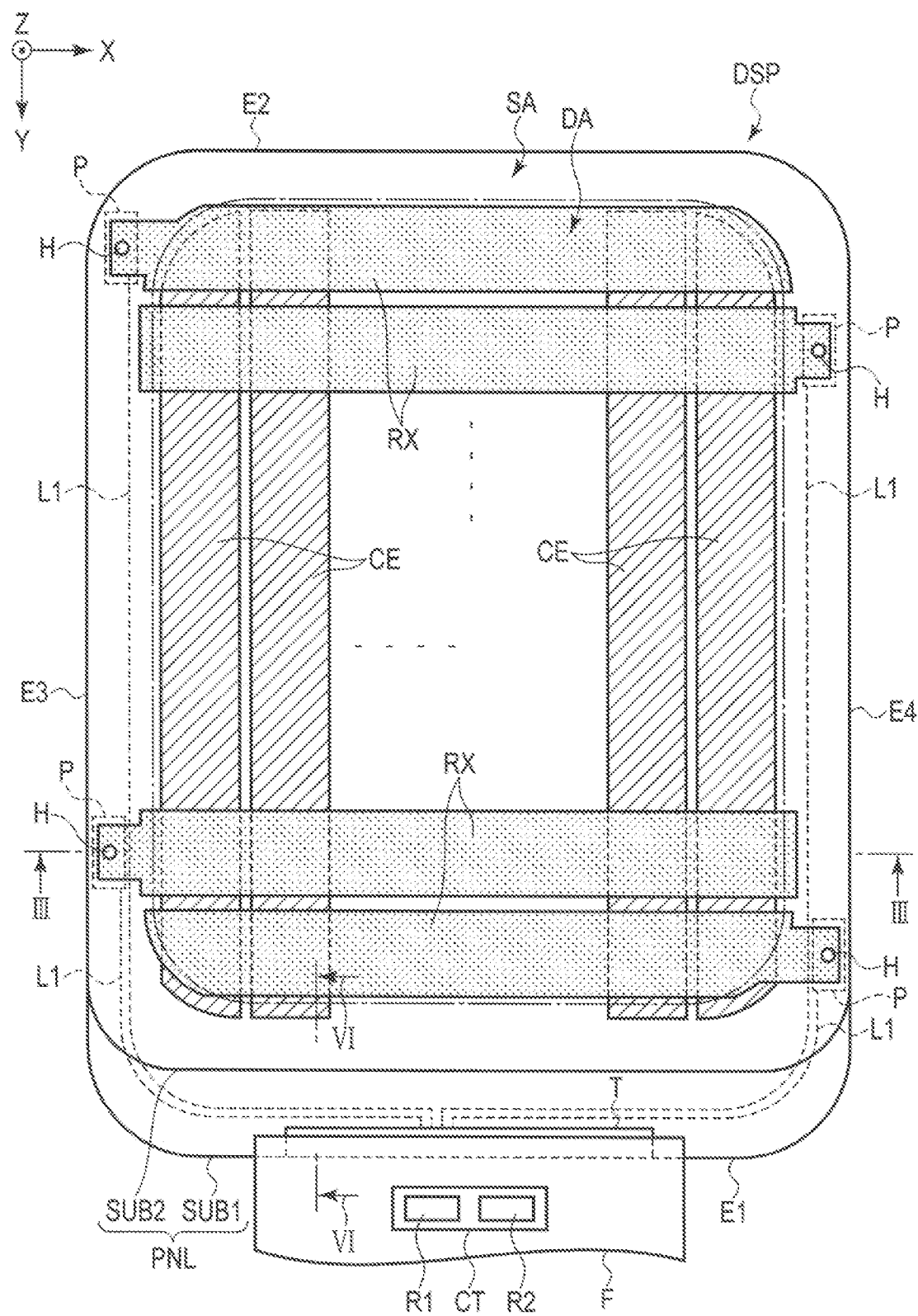
FIG. 2 is a plan view showing a configuration example of a display device in relation to a touch detecting function.

FIG. 2 is a plan view showing the display device DSP, illustrating a configuration example relating to the touch detecting function. The display device DSP comprises detection electrodes RX. The detection electrodes RX extend in the first direction X and are arranged in the second direction Y, in the display area DA. Furthermore, the common electrodes CE are disposed in the display area DA, in the example shown in FIG. 2. The common electrodes CE extend in the second direction Y and are arranged in the first direction X.

Each of the common electrodes CE comprises not only a function of the electrode for image display, but also a function of the sensor electrode for detecting an object close to the display area DA together with each of the detection electrodes RX. In the embodiments, it is assumed that the common electrodes CE are disposed on the first substrate SUB1 and the detection electrodes RX are disposed on the second substrate SUB2. However, a configuration where a sensor electrode different from the common electrode CE is provided may also be employed in the display device DSP. In addition, arrangement of the detection electrodes RX and the common electrodes CE (or sensor electrodes) can be modified variously. For example, the detection electrodes RX may be arranged in the first direction X and the common electrodes CE may be arranged in the second direction Y. In addition, the common electrodes CE (or sensor electrodes) may be provided on the second substrate SUB2. In addition, sensor electrodes different from the detection electrodes RX and the common electrodes CE may be provided on a transparent base disposed on the display surface of the display panel PNL.

In the example shown in FIG. 2, the first substrate SUB1 comprises pads P and leads L1 which electrically connect the pads P to the connection terminals of the connection terminal group T, in the peripheral area SA. The detection electrodes RX are electrically connected to the pads P through connection holes H, respectively. The pads P are electrically connected to the connection terminals of the connection terminal group T via the leads L1. As shown in the figure, for example, odd-numbered detection electrodes RX are connected to the pads P disposed between the end portion E3 and the display area DA, and even-numbered detection electrodes RX are connected to the pads P disposed between the end portion E4 and the display area DA.

Figure 3:
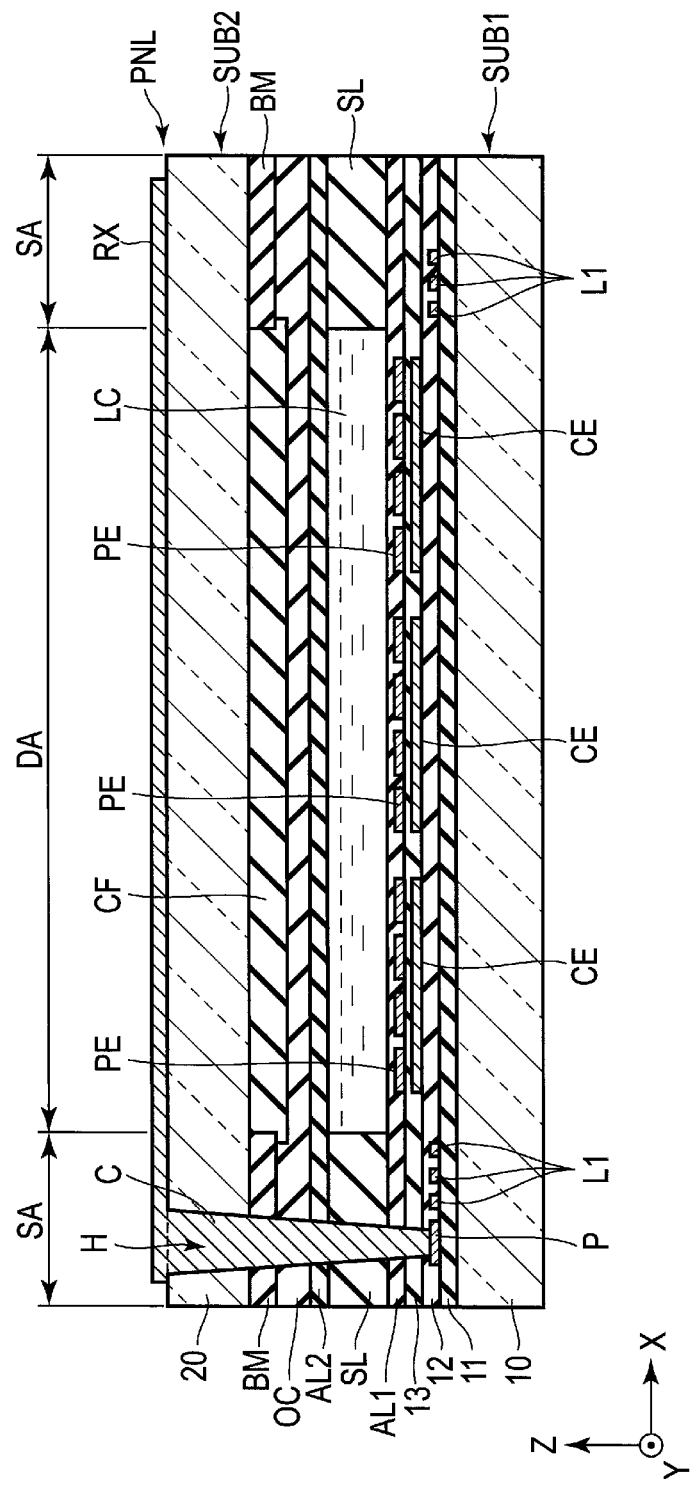
FIG. 3 is a cross-sectional view showing the display panel seen along line III-III in FIG. 2.

FIG. 3 is a cross-sectional view showing the display panel PNL seen along line in FIG. 2. The first substrate SUB1 comprises a first basement 10 such as a glass substrate, a resin substrate or the like, a first insulating layer 11, a second insulating layer 12, a third insulating layer 13, a first alignment film AL1, and the above-explained common electrodes CE and pixel electrodes PE. The first substrate SUB1 also comprises the above-explained scanning lines G, signal lines S, switching elements SW, and the like, which are not illustrated in FIG. 3.

The first insulating film 11 is disposed on the first basement 10. The pads P and the leads L1 are disposed on the first insulating layer 11. The second insulating layer 12 covers the pads P and the leads L1. The pads P and the leads L1 may be located on the same layer or different layers, though not described in detail. In addition, several parts of the leads L1 may be located on the same layer as the pads P.

The common electrodes CE are disposed on the second insulating layer 12. The third insulating layer 13 covers the common electrodes CE and the second insulating layer 12. The pixel electrodes PE are disposed on the third insulating layer 13 and are opposed to the common electrodes CE via the third insulating layer 13. The first alignment film AL1 covers the pixel electrodes PE and the third insulating layer 13.

The second substrate SUB2 comprises a second basement 20 of a glass substrate, a resin substrate or the like, a light-shielding layer BM, a color filter CF, an overcoat layer OC, and a second alignment film AL2. The light-shielding layer BM is located in the peripheral area SA and disposed under the second basement 20. The color filter CF is located in at least the display area DA and disposed under the second basement 20 and the light-shielding layer BM. The second substrate SUB2 may further comprise a light-shielding layer between the sub-pixels in the display area DA in addition to the light-shielding layer BM. The color filter CF includes layers of colors corresponding to the sub-pixels SPR, SPG, and SPB. The overcoat layer OC covers the light-shielding layer BM and the color filter CF. The overcoat layer OC may be used as needed. The second alignment film AL2 covers the overcoat layer OC. The color filter CF may be disposed on the first substrate SUB1.

The first substrate SUB1 and the second substrate SUB2 are bonded by a sealing member SL located in the peripheral area SA. The liquid crystal layer LC is formed in a space surrounded by the first alignment film AL1, the second alignment film AL2, and the sealing member SL.

The detection electrode RX is disposed on the second basement 20. The connection hole H penetrates the second basement 20, the light-shielding layer BM, the second alignment film AL2, the sealing member SL, the first alignment film AL1, the third insulating layer 13, and the second insulating layer 12. The connection hole H may further penetrate the pad P. The connection hole H is, for example, tapered toward the pad P as shown in the figure but is not limited to this example. A conductive connecting member C is disposed inside the connection hole H. The detection electrode RX is electrically connected to the pad P via the connecting member C.

The pixel electrodes PE and the common electrode CE can be formed of, for example, a transparent conductive material such as ITO (indium tin oxide). The detection electrode RX, the pad P, and the leads L1 can be formed of a transparent conductive material such as ITO or a metal material. When the detection electrode RX is formed of a metal material, for example, an electrode pattern in which thin metal wires in a single-layer structure or a multilayer structure are disposed in a mesh shape or a waveform can be employed.

The cross-sectional structure shown in FIG. 3 is a mere example and other various configurations can be employed in the display panel PNL. For example, the common electrodes CE may be disposed between the pixel electrodes PE and the liquid crystal layer LC, disposed on the same layer as the layer of the pixel electrodes PE, or disposed on the second substrate SUB2. In addition, the first alignment film AL1 and the second alignment film AL2 may not be disposed at the position of the connection hole H.

In the above-explained configuration, a first capacitance is formed between the detection electrode RX and the common electrodes CE. In addition, if a conductive material or a conductive object such as a user's finger approaches the display area DA, a second capacitance is formed between the object and the detection electrode RX. The detection driver R2 supplies an alternating drive signal (second drive signal) for object detection to the common electrode CE and drives the common electrode CE. At this time, the detection signal is output from the detection electrode RX to the detection driver R2 via the first capacitance. This detection signal is varied in accordance with the presence of the second capacitance and the value of the second capacitance. Therefore, the detection driver R2 can detect the presence of the object approaching the detection electrode RX, the degree of approach of the object to the detection electrode RX, and a coordinate position of the object in the display area DA, based on the detection signal.

The detection mode explained here is called, for example, mutual capacitive sensing mode. However, the object detection is not only limited to the mutual capacitive sensing mode, but may also be self capacitive sensing mode. In the self capacitive sensing mode, the drive signal is supplied to the detection electrode RX and the detection signal is read from the detection electrode RX, and the presence of the object approaching the detection electrode RX, the degree of approach of the object to the detection electrode RX, and the coordinate position of the object in the display area DA can be detected, based on the detection signal. In addition, in the self capacitive sensing mode, the drive signal may be supplied to the common electrode CE and the detection signal may be read from the common electrode CE.

Next, the configuration of the peripheral circuits (scanning line driver GD1 and GD2, signal line driver SD, and the like) disposed in the peripheral area SA will be explained.

Figure 4:
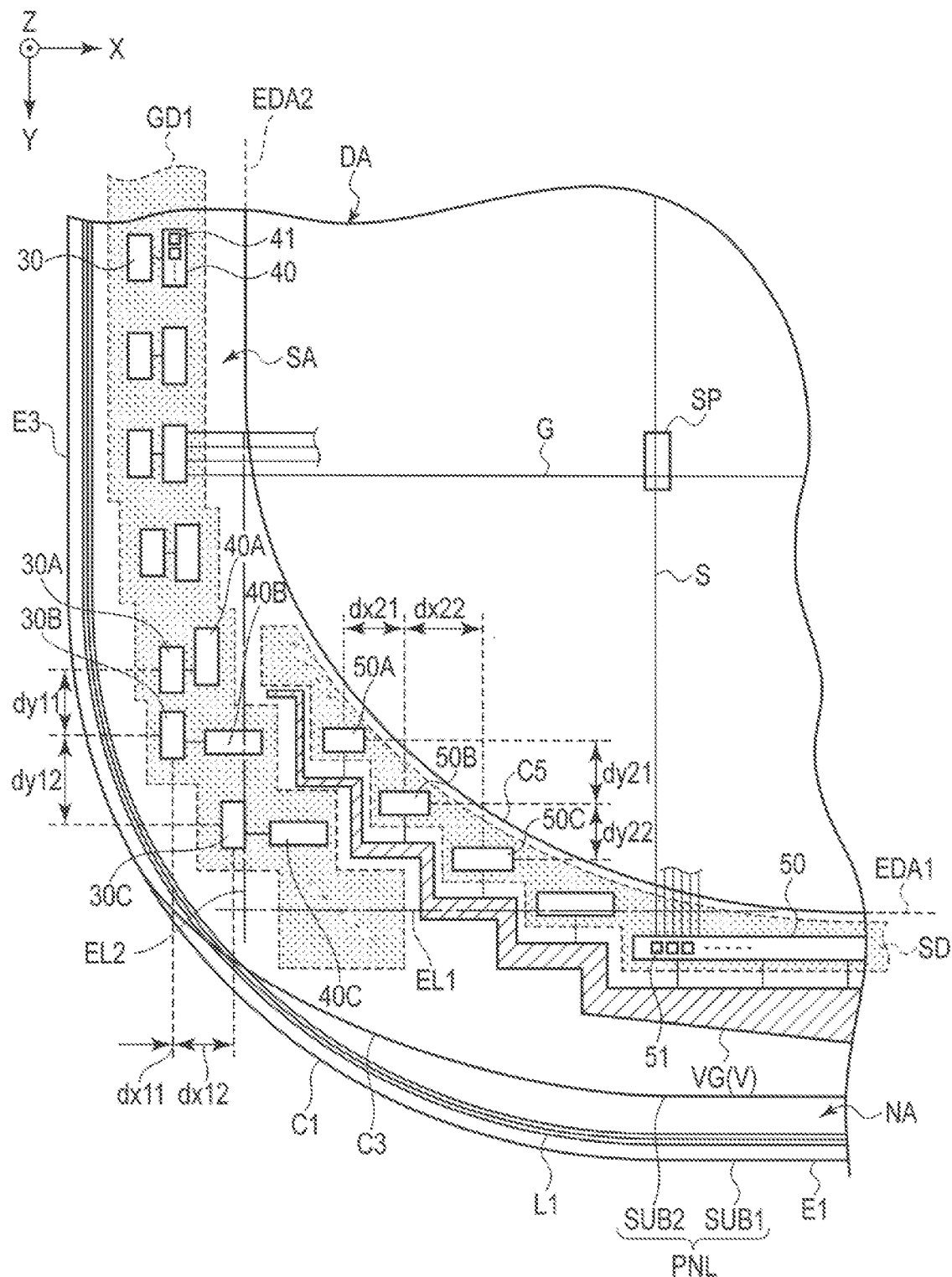
FIG. 4 is a plan view showing a configuration example of the peripheral circuits close to a corner portion of the display panel.

FIG. 4 is a plan view showing a configuration example of the peripheral circuits close to the lower left corner portion of the display panel PNL. The scanning line driver GD1 comprises shift register units 30 and buffer units 40 which are connected to the respective shift register units 30 and which are connected to at least one scanning line G. Each of the shift register units 30 constitutes a shift register which controls timing for sequentially supplying the scanning signals to the respective scanning lines G. The buffer unit 40 includes at least one buffer circuit 41. The buffer circuit 41 supplies scanning signals (scanning voltages) to the scanning lines G under control of the shift register units 30.

The first substrate SUB1 comprises a video line group VG including video lines V, in the peripheral area SA. The video line group VG is arranged along the signal line driver SD. Each of the video lines V constituting the video line group VG is electrically connected to the display driver R1 via the above-explained connection terminal group T and the circuit board F. In the example shown in FIG. 4, the signal line driver SD is disposed between the video line group VG and the display area DA. Furthermore, the video line group VG extends between the scanning line driver GD1 and the signal line driver SD, in an area where the signal line driver SD is located between the scanning line driver GD1 and the display area DA.

The signal line driver SD comprises selector units 50. Each of the selector units 50 includes at least one selector circuit 51 (selector switch). N video lines V and M signal lines S where M is more than N (M>N) are connected to the selector circuit 51. For example, N=2 and M=6. The selector circuit 51 switches the signal lines S connected to the video lines V by time division. The video signal can be thereby supplied to each of the signal lines S by the video lines V whose number is smaller than the number of the signal lines S disposed in the display area DA.

The lead L1 which connects the detection electrode RX to the connection terminal group T is disposed along the edge portion of the first substrate SUB1. The scanning line driver GD1, the signal line driver SD, and the video line group VG are located between the lead L1 and the display area DA. The lead L1 is curved in an arcuate shape similarly to the corner portion C1, at a position close to the corner portion C1. In the example shown in FIG. 4, the distance between the lead L1 and the outer edge of the first substrate SUB1 is entirely constant but may be partially varied. For example, the distance between the lead L1 and the outer edge of the first substrate SUB1 at a position close to the corner portion C1 may be increased toward the end portion E1.

The scanning line driver GD1 and the signal line driver SD are provided in an area curved along the corner portion C5, at positions close to the corner portion C5 on the side of the terminal area NA of the display area DA. A part of the scanning line driver GD1 and a part of the signal line driver SD are provided along the outer edge of the lower left corner portion C5, and located on the side of the corner portion (lower left corner portion) C5 from extension line EL1 of a side EDA1 in the terminal area NA of the display area DA. In addition, a part of the scanning line driver GD1 and a part of the signal line driver SD are located on the side of the corner portion (lower left corner portion) C5 from extension line EL2 of a side EDA2 in the display area DA which is the closest to the end portion E3. In other words, a part of the scanning line driver GD1 and a part of the signal line driver SD are located in an area surrounded by the outer edge of the lower left corner portion C5, the extension line EL1, and the extension line EL2.

Attention has been focused on the area close to the lower left corner portion C5 in FIG. 4, but a relationship among the lower right corner portion C5, a part of the scanning line driver GD2, and a part of the signal line driver SD in the area close to the lower right corner portion C5 is similar to the relationship explained above.

However, the relationship among the fifth corner portion C5 on the terminal area NA side, the scanning line driver GD, and the signal line driver SD is not limited to the embodiments but can be variously modified. For example, the relationship among one of two fifth corner portions C5 on the terminal area NA side, the scanning line driver GD, and the signal line driver SD may be the same as the above-explained relationship. In this case, a part of the scanning line driver GD and a part of the signal line driver SD are provided along the outer edge of at least one of two fifth corner portions C5 on the terminal area NA side, located on the side of the fifth corner portion C5 from the extension line EL1, and located on the fifth corner portion C5 from the extension line EL2.

The number of the selector circuits 51 included in each of the selector units 50 is reduced in the selector unit 50 closer to the end portion of the signal line driver SD. The width of the selector unit 50 in the first direction X is reduced in the selector unit 50 closer to the end portion of the signal line driver SD.

In the example shown in FIG. 4, the video line group VG is formed in a step shape where the portions extending in the first direction X and the portions extending in the second direction Y are alternately repeated, and one selector unit 50 is disposed at each step. However, a plurality of selector units 50 may be disposed at each step. In addition, at least a part of the video line group VG may extend in a direction which intersects the first direction X and the second direction Y.

For example, attention will be focused on shift register units 30A, 30B, and 30C and buffer units 40A, 40B, and 40C connected to the shift register units, of the shift register units 30 and the buffer units 40. The shift register unit 30A is adjacent to the shift register unit 30B, and the shift register unit 30B is adjacent to the shift register unit 30C. In addition, the buffer unit 40A is adjacent to the buffer unit 40B, and the buffer unit 40B is adjacent to the buffer unit 40C.

An interval between the shift register unit 30A and the shift register unit 30B in the first direction X is defined as dx11, an interval between the shift register unit 30B and the shift register unit 30C in the first direction X is defined as dx12, an interval between the shift register unit 30A and the shift register unit 30B in the second direction Y is defined as dy11, and an interval between the shift register unit 30B and the shift register unit 30C in the second direction Y is defined as dy12. In this case, in the example shown in FIG. 4, the interval dx11 and the interval dx12 are different from each other. More specifically, the interval dx11 is zero since the interval dx11 is smaller than the interval dx12 and the shift register units 30A and 30B are not shifted in the first direction X. Furthermore, in the example shown in FIG. 4, the interval dy11 and the interval dy12 are different from each other. More specifically, the interval dy11 is smaller than the interval dy12. In the other example, the shift register units 30A, 30B, and 30C may be disposed such that dx11 is larger than dx12 or disposed such that dy11 is larger than or equal to dy12.

In the example shown in FIG. 4, an interval between the buffer units 40A and 40B in the first direction X is different from an interval between the buffer units 40B and 40C in the first direction X, similarly to the intervals dx11 and dx12. In addition, an interval between the buffer units 40A and 40B in the second direction Y is different from an interval between the buffer units 40B and 40C in the second direction Y, similarly to the intervals dy11 and dy12. The buffer units 40A, 40B, and 40C are disposed in a step shape such that intervals to the outer edge of the lower left corner portion C5 in the first direction X are substantially the same.

Furthermore, attention will be focused on, for example, the selector units 50A, 50B, and 50C of the selector units 50. The selector unit 50A is adjacent to the selector unit 50B, and the selector unit 50B is adjacent to the selector unit 50C. The selector units 50A, 50B, and 50C are displaced from each other in the first direction X and the second direction Y. The selector unit 50A is located more closely to the side of the end portion of the signal line driver SD than the selector unit 50B, and the selector unit 50B is located more closely to the side of the end portion of the signal line driver SD than the selector unit 50C. A width of the selector unit 50A is smaller than a width of the selector unit 50C, in the first direction X.

An interval between the selector unit 50A and the selector unit 50B in the first direction X is defined as dx21, an interval between the selector unit 50B and the selector unit 50C in the first direction X is defined as dx22, an interval between the selector unit 50A and the selector unit 50B in the second direction Y is defined as dy21, and an interval between the selector unit 50B and the selector unit 50C in the second direction Y is defined as dy22.

In this case, in the example shown in FIG. 4, the interval dx21 and the interval dx22 are different from each other. More specifically, the interval dx21 is smaller than the interval dx22. In addition, in the example shown in FIG. 4, the interval dy21 and the interval dy22 approximately agree with each other. In the other example, the selector units 50A, 50B, and 50C may be disposed such that dx21 is larger than or equal to dx22 or disposed such that the interval dy21 is different from the interval dy22. The selector units 50A, 50B, and 50C are disposed in a step shape such that intervals to the outer edge of the lower left corner portion C5 in the second direction Y are substantially the same.

Thus, the scanning line driver GD1 of the layout curved in an arcuate shape along the corner portion C5 can be implemented by adjusting the intervals of the shift register units 30 and the buffer units 40 in the directions X and Y at the positions close to the corner portion C5 on the terminal area NA side. Similarly, the signal line driver SD of the layout curved in an arcuate shape along the corner portion C5 can be implemented by adjusting the intervals of the selector units 50 in the directions X and Y, at the positions close to the corner portion C5 on the terminal area NA side.

In the above explanations, the interval (dx11, dx12, dx21, dx22 or the like) between two adjacent units in the first direction X corresponds to the interval between the centers of the units in the first direction X. In addition, the interval (dy11, dy12, dy21, dy22 or the like) between two adjacent units in the second direction Y corresponds to the interval between the centers of the units in the second direction Y.

The configuration of the scanning line driver GD1 at a position close to the upper left corner portion C5 in the display area DA shown in FIG. 1 is the same as the configuration of the scanning line driver GD1 at a position close to the lower left corner portion C5. In addition, the configuration of the scanning line driver GD (GD2), the signal line driver SD, the video line group VG, and the lead L1 at positions close to the lower right corner portion C5 in the display area DA is the same as their configuration at positions close to the lower left corner portion C5. Furthermore, the configuration of the scanning line driver GD2 at a position close to the upper right corner portion C5 in the display area DA is the same as the configuration of the scanning line driver GD1 at a position close to the upper left corner portion C5. The configuration at positions close to four corner portions C5 in the display area DA, of the peripheral area SA, is not limited to the example explained here, but can be arbitrarily modified in consideration of the layout of the disposed circuits and lines.

Figure 5:
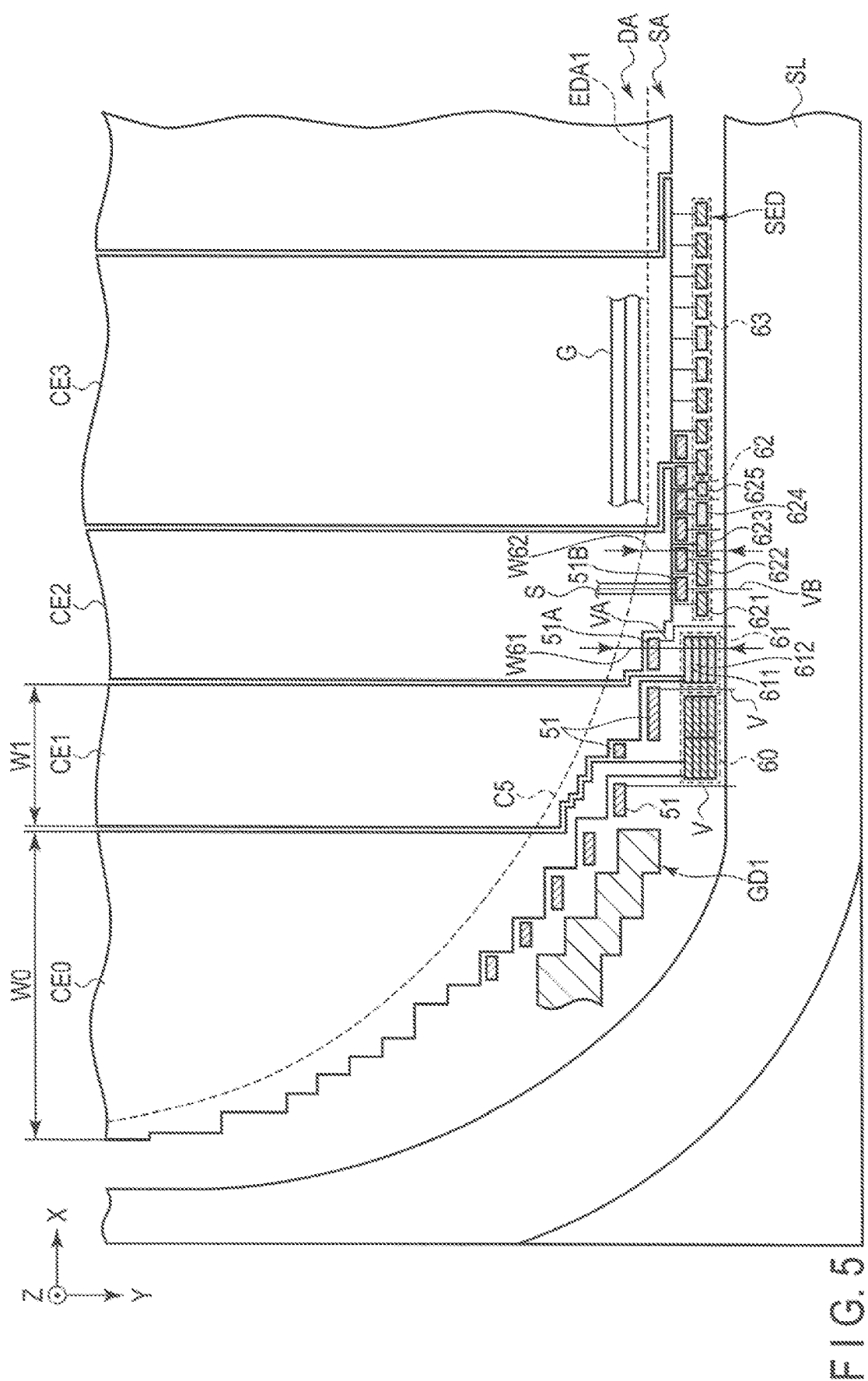
FIG. 5 is a plan view showing a configuration example of a common electrode shown in FIG. 2.

Next, a concrete configuration example of the common electrode CE shown in FIG. 2 will be explained with reference to a plan view of FIG. 5. The members at positions close to the lower left corner portion C5 which is the round portion will be explained here. Common electrodes CE0, CE1, CE2, CE3, . . . are arranged in this order in the first direction X and extend in the second direction Y. In the example illustrated, the common electrodes CE0 and CE3 are wider than the common electrodes CE1 and CE2 and, for example, a width W0 of the common electrode CE0 in the first direction X is approximately twice as large as a width W1 of the common electrode CE1. In the sensor function capable of switching the mutual capacitive sensing mode and the self-capacitive sensing mode, centers of sensors in both of the modes can be made to agree with each other and unbalance of capacitance of common electrodes can be improved in the self-capacitive sensing mode, by employing the common electrodes having the above widths, though not described in detail.

A switch unit 60 is connected to the common electrode CE0, a switch unit 61 is connected to the common electrode CE1, a switch unit 62 is connected to the common electrode CE2, and a switch unit 63 is connected to the common electrode CE3. The switch units including the switch units 60 to 63 compose a sensor electrode driver SED which drives common electrodes (sensor electrodes) CE. Each of the switch units 60 to 63 is surrounded by a dashed line in the figure. The switch units 60 to 63 selectively supply first drive signals or second drive signals to the common electrodes connected to the respective switch units. The second drive signal is different from the first drive signal. For example, the first drive signal is a DC common signal necessary to display the images in the display area DA. In addition, the second drive signal is an AC drive signal necessary for object detection.

Each of the common electrodes CE0, CE1, and CE2 comprises an outer edge having a step shape along the corner portion C5. As explained above, a part of the scanning line driver GD1 is provided in the area curved along the corner portion C5 and supplies the scanning signal to the scanning line G at a position close to the side EDA1, in the display area DA. All of the switch units are disposed in areas different from the scanning line driver GD1. For this reason, the common electrode CE0 and the switch unit 60 cannot be arranged in the second direction Y, and the scanning line driver GD1 and the common electrode CE0 are arranged in the second direction Y. The common electrode CE1 and the switch unit 60 are arranged in the second direction Y and, similarly, the common electrode CE2 and the switch unit 61 are arranged in the second direction Y. In addition, a part of the switch unit 62 and the common electrode CE2 are arranged in the second direction Y, and the other parts of the switch unit 62 and the common electrode CE3 are arranged in the second direction Y. Most parts of the switch unit 63 and the common electrode CE3 are arranged in the second direction Y.

Explanations will be focused on the switch units 61 and 62. The switch unit 61 comprises switch circuits 611, 612, . . . arranged in the second direction Y. The switch unit 62 comprises switch circuits 621, 622, . . . arranged in the first direction X. In the switch unit 62, the switch circuits 621 to 623 and the common electrode CE2 are arranged in the second direction Y. A circuit group of the switch circuits 624 and 625 and the common electrode CE3 are arranged in the second direction Y. The configurations and the functions of the switch circuits are substantially the same. Each of the switch circuits is represented by upward-sloping hatch lines in the figure. As regards intervals between a sealing member SL and the lower left corner portion C5 in the second direction Y, an interval W61 including an area where the switch unit 61 is disposed is larger than an interval W62 including an area where the switch unit 62 is disposed. For this reason, the switch unit 61 is suitable for arrangement of the switch circuits in the second direction Y.

Portions represented by the downward-sloping hatch lines in the figure correspond to the selector circuits 51. The video lines V are connected to the selector circuits 51, respectively. The selector circuits 51 and the video lines V do not overlap any common electrodes. In other words, the common electrodes CE0 to CE3 extend to not only the display area DA, but also the peripheral area SA, but do not extend to the side closer to the sealing member SL than to the position overlapping the selector circuit 51 disposed in the peripheral area SA. For this reason, the common electrodes CE0 to CE3 do not overlap the video line V located on the side closer to the sealing member SL than to the selector circuit 51, and suppress undesired capacitance formation between the video line V and the common electrodes.

In the example illustrated, the switch units 60 and 61 do not intersect any video lines V. The switch unit 62 intersects the video line V. For example, when attention is focused on the selector circuit adjacent to the common electrode CE2, the selector circuit 51A is located between the switch unit 61 and the common electrode CE2. A video line VA connected to the selector circuit 51A is located between the switch units 61 and 62. A selector circuit 51B is located between the switch unit 62 and the common electrode CE2. A video line VB connected to the selector circuit 51B is located between the switch circuits 621 and 622 of the switch unit 62.

Figure 6:
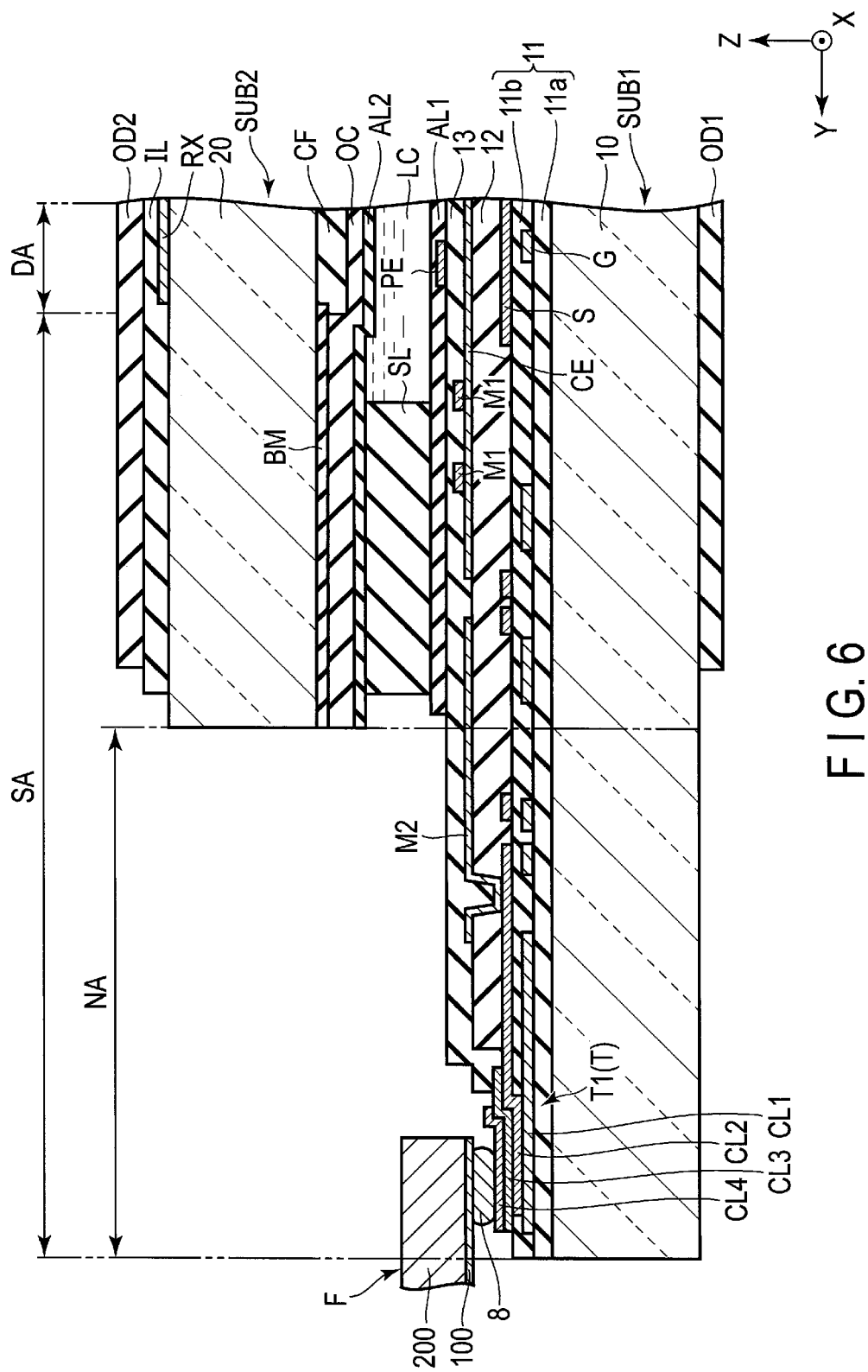

Next, a cross-sectional structure of the display panel PNL will be explained. A cross-sectional structure of the display panel PNL in the terminal area NA will be explained particularly. FIG. 6 is a cross-sectional view showing parts of the display device DSP seen along line VI-VI in FIG. 2, illustrating the terminal area NA, and the like.

As shown in FIG. 6, the connection terminal T1 of the connection terminal group T includes a first layer CL1, a second layer CL2, a third layer CL3, and a fourth layer CL4 and has a stacked structure. In addition, the first insulating layer 11 includes an insulating layer 11a and an insulating layer 11b. A semiconductor layer of the switching element SW is located between the first basement 10 and the insulating layer 11a. The scanning lines G and the first layer CL1 are located between the insulating layers 11a and 11b. For this reason, the scanning lines G and the first layer CL1 can be formed of the same material, simultaneously.

The signal lines S and the second layer CL2 are located between the insulating layer 11b and the second insulating layer 12. For this reason, the signal lines S and the second layer CL2 can be formed of the same material, simultaneously. The second layer CL2 is in contact with the first layer CL1 through a contact hole formed in the insulating layer 11b. The second layer CL2 forms a part of the connection terminal T1.

The second insulating layer 12 is provided except the area for formation of the connection terminal group T. The common electrode CE is located on the second insulating layer 12, and the third layer CL3 is located on the second insulating layer 12 and the second layer CL2. The third layer CL3 is in contact with the second layer CL2. The common electrode CE and the third layer CL3 can be formed of the same material, simultaneously. A metal layer M1 is located on the common electrode CE. The metal layer M2 is located on the second insulating film 12 and is in contact with the second layer CL2 through the contact hole formed in the second insulating film 12. The metal layers M1 and M2 can be formed of the same material, simultaneously. In the present embodiment, the metal layers M1 and M2 are formed integrally.

The third insulating layer 13 is provided except the area for formation of the connection terminal group T. The pixel electrode PE is located on the third insulating layer 13, and the fourth layer CL4 is located on the third layer CL3 and is in contact with the third layer CL3. The pixel electrode PE and the fourth layer CL4 can be formed of the same material, simultaneously.

An insulating layer IL is formed on the second basement 20 and the detection electrode RX to cover the detection electrode RX.

The circuit board F is mounted in the terminal area NA of the first substrate SUB1 via the anisotropically conductive film 8 which is formed of the conductive material. The circuit board F comprises a core substrate 200, and a connection wiring 100 disposed on a lower surface side of the core substrate 200.

A first optical element OD1 including a polarizer is disposed under the first basement 10. A second optical element OD2 including a polarizer is located on the insulating layer IL. Each of the first optical element OD1 and the second optical element OD2 may include a retardation film as needed.

Figure 7:
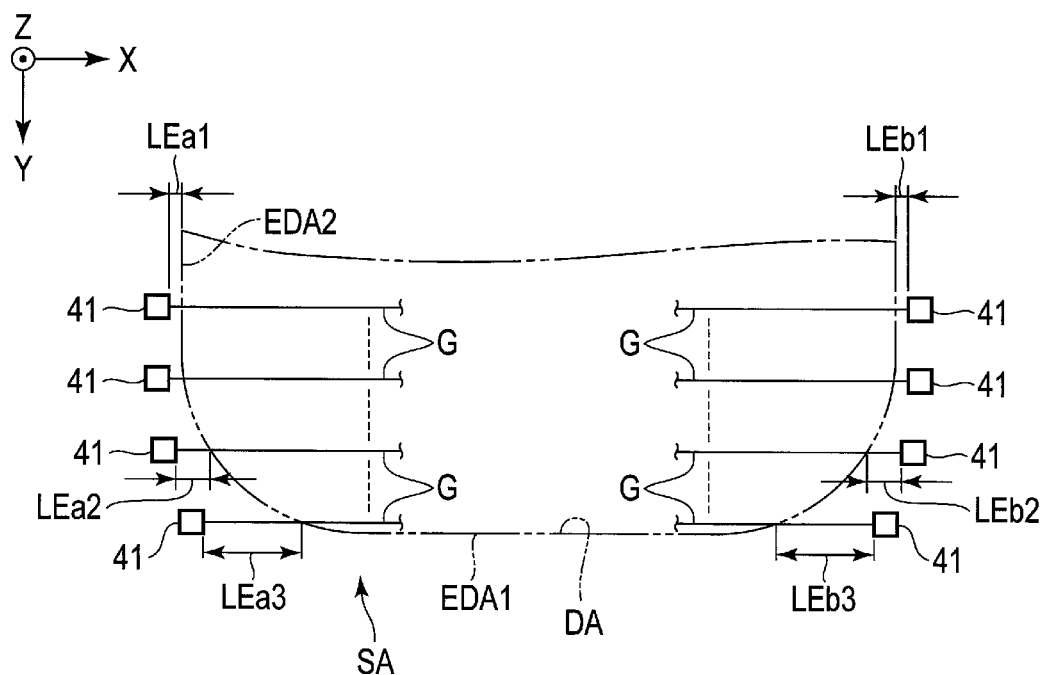
FIG. 7 is a plan view showing scanning lines and buffer circuits.

Next, the scanning lines G will be explained. FIG. 7 is a plan view showing the scanning lines G and the buffer circuits 41.

As shown in FIG. 7, the lengths of the scanning lines G are irregular in the display area DA since the display area DA includes the round corner portion C5. Thus, the scanning lines G are longer in the peripheral area SA as the scanning lines G are shorter in the display area DA. In other words, lengths LE of the scanning lines G from the buffer circuits 41 to the display area DA are larger as the scanning lines G are shorter in the display area DA.

The lengths LEa1, LEa2, and LEa3 are different from one another in the scanning lines G at positions close to the lower left corner portion C5 in the display area DA of the peripheral area SA. The length LEa1 is a length of the scanning line G from the buffer circuit 41 to the side EDA2, and is shorter than any one of the lengths LEa2 and LEa3 (LEa1<LEa2, LEa1<LEa3). Each of the lengths LEa2 and LEa3 is equal to a length from the buffer circuit 41 to the outer edge of the corner portion C5. The scanning line G having the length LEa3 is located more closely to the side EDA1 side than the scanning line G having the length LEa2. For this reason, the length LEa3 is larger than the length LEa2 (LEa3>LEa2).

The above-mentioned matter is applied to the scanning line G close to the lower right corner portion C5, the scanning line G close to the upper left corner portion C5, and the scanning line G close to the upper right corner portion C5, in the display area DA of the peripheral area SA. For example, LEb1 is shorter than LEb2, and LEb2 is shorter than LEb3, in the scanning lines G close to the lower right corner portion C5 in the peripheral area SA.

Irregularity in loads on the scanning lines G can be reduced based on the above-mentioned matters.

Figure 8:
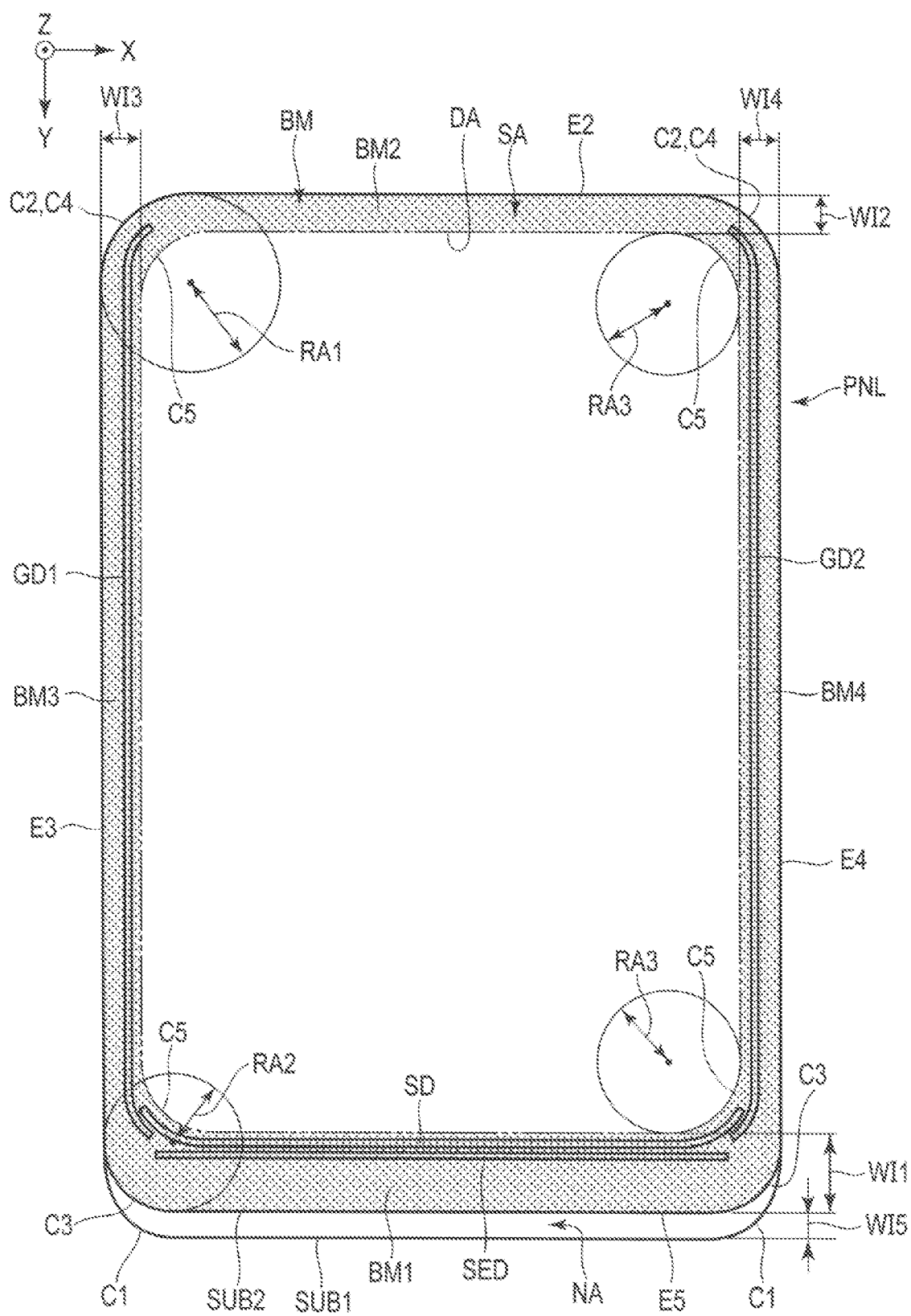
FIG. 8 is a plan view showing the display panel.

Next, the first substrate SUB1 including the scanning line drivers GD1 and GD2, the signal line driver SD, and the sensor electrode driver SED, and the second substrate SUB2 including the light-shielding layer BM will be explained. FIG. 8 is a plan view showing the display panel PNL.

As shown in FIG. 8, an outer edge of the lower right corner portion C3 is located at a position more close to the display area DA side than an outer edge of the lower right corner portion C1. Similarly, an outer edge of the lower left corner portion C3 is located at a position more close to the display area DA side than an outer edge of the lower left corner portion C1. Outer edges of the corner portions C4 overlap outer edges of the corresponding corner portions C2, respectively, in planar view.

Each of the corner portions C1 and C2 of the first substrate SUB1 and the corner portions C4 of the second substrate SUB2 has a radius of curvature RA1. It is needless to say that the radius of curvature of the corner portions C2 and the radius of curvature of the corner portions C4 are the same. Each of the corner portions C3 of the second substrate SUB2 has a radius of curvature RA2. Each of the corner portions C5 of the display area DA has a radius of curvature RA3. The radii of curvature RA1, RA2, and RA3 are different from one another. For example, in the above-mentioned radii of curvature, the radius of curvature RA1 is the largest and the radius of curvature RA2 is the smallest (RA1>RA3>RA2). The radius of curvature of the corner portion C3 is shorter than that of each of the corner portions C1, C2, and C4. For example, RA1 is 5.7 mm, RA2 is 4.7 mm, and RA3 is 5.0 mm. However, the relationship among the corner portions C1 to C5 is not limited to that in this example.

The light-shielding layer BM has a frame shape and is provided in the peripheral area SA on the outside of the display area DA. An inner edge of the light-shielding layer BM forms a boundary between the display area DA and the peripheral area SA. The scanning line drivers GD1 and GD2, the signal line driver SD, and the sensor electrode driver SED, are located in the peripheral area SA and covered with the light-shielding layer BM. The sensor electrode driver SED is partially opposed to the outer edges of two corner portions C5 on the terminal area NA side. The sensor electrode driver SED may be partially opposed to the outer edge of at least one of two corner portions C5 on the terminal area NA side.

The light-shielding layer BM includes four extending portions BM1, BM2, BM3, and BM4 which extend along four sides of the display area DA. The extending portion BM1 is located between the display area DA and the end portion E5, extends in the first direction X, and has a width WI1. The extending portion BM2 is located between the display area DA and the end portion E2, extends in the first direction X, and has a width WI2. The extending portion BM3 is located between the display area DA and the end portion E3, extends in the second direction Y, and has a width WI3. The extending portion BM4 is located between the display area DA and the end portion E4, extends in the second direction Y, and has a width WI4. The terminal area NA has a width WI5.

The widths WI3 and WI4 are widths in the first direction X, and the widths WI1, WI2, and WI5 are widths in the second direction Y. The width WI1 of the extending portion BM1 is larger than the width WI5 of the terminal area NA (WI1>WI5). For example, a width between the corner portions C5 and C3 of the light-shielding layer BM is larger than a width between the corner portions C3 and C1 of the terminal area NA. The width WI1 may be larger than the width WI2. For example, the width between the corner portions C5 and C3 may be larger than a width between the corner portion C4 and the display area DA (corner portion C5).

Each of the widths WI3 and WI4 of two extending portions BM3 and BM4 that extend in a direction intersecting the direction of extension of the terminal area NA is larger than the width WI5 of the terminal area NA (WI3>WI5, WI4>WI5). The width WI1 of the extending portion BM1 is larger than any one of the widths WI3 and WI4 of two extending portions BM3 and BM4 (WI1>WI3, WI1>WI4). For example, WI1 is 0.9 mm, each of WI2, WI3, and WI4 is 0.7 mm, and WI5 is 0.6 mm. However, the relationship among the widths WI1 to WI5 is not limited to that in this example.

Next, a manufacturing method for obtaining outlines of the first substrate SUB1 and the second substrate SUB2 will be explained.

When manufacturing the display panel PNL, a first motherboard including the first substrates SUB1 and a second motherboard including the second substrates SUB2 are prepared, and the first motherboard and the second motherboard are bonded such that the first substrate SUB1 and the second substrate SUB2 are opposed in one-on-one relationship. After that, the first motherboard and the second motherboard are mechanically cut with a cutter. Thus, the display panels PNL can be cut from the assembly of the first motherboard and the second motherboard and the outer shapes of the display panels PNL can be adjusted.

The outlines of the first substrate SUB1 and the second substrate SUB2 can be adjusted by a single stroke with a cutter. This is because in the first substrate SUB1 and the second substrate SUB2, the linear end portions E are not directly joined, but the linear end portions E are directly joined to the round corner portions C. In other words, this is because the outlines of the first substrate SUB1 and the second substrate SUB2 can be obtained without turning the orientation of a cutter blade at ninety degrees and abutting the cutter blade on the substrates again.

In addition, an orbit of cutting with the cutter to obtain the outline of the second substrate SUB2 does not intersect an orbit of cutting with the cutter to obtain the outline of the first substrate SUB1. For this reason, the display panel PNL of high manufacturing yield can be obtained as compared with a case where the orbits intersect.

According to the embodiments, as described above, the display device capable of narrowing the frame can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
a first substrate including a display area, a terminal area located outside the display area, a first side extending in a first direction, and a third side extending in a second direction intersecting the first direction; and
a second substrate opposed to the first substrate and including a fifth side extending along the first side and a seventh side extending in the second direction,
wherein
the terminal area is sandwiched between the third side and the seventh side,
the first substrate includes a first round corner between the first side and the third side,
the second substrate includes a third round corner between the fifth side and the seventh side, and
a radius of curvature of the third round corner is smaller than a radius of curvature of the first round corner.

2. The display device of claim 1, wherein
the second substrate includes a light-shielding film around the display area, and
an edge of the light-shielding film on the display area side includes a fifth round corner opposed to the first round corner.

3. The display device of claim 1, wherein
the first substrate includes a second side opposed to the first side, a fourth side opposed to the third side, and a second round corner located between the first side and the fourth side,
the second substrate includes a sixth side opposed to the fifth side, an eighth side opposed to the seventh side, and a fourth round corner located between the fifth side and the eighth side,
a radius of curvature of the second round corner is equal to a radius of curvature of the fourth round corner, and
an outer edge of the fourth round corner overlaps an outer edge of the corresponding second round corner, in planar view.

4. The display device of claim 3, wherein
the radius of curvature of the third round corner is smaller than the radius of curvature of the fourth round corner.

5. The display device of claim 3, wherein
the second substrate includes a light-shielding film around the display area,
an edge of the light-shielding film on the display area side includes a fifth round corner opposed to the first round corner, and
the radius of curvature of the fifth round corner is smaller than the radius of curvature of the fourth round corner.

6. A display device, comprising:
a first substrate including a display area, a terminal area located outside the display area, and four sides; and
a second substrate being opposed to the first substrate and including four sides,
wherein
the first substrate includes a first curved portion between linear portions of adjacent two sides,
the second substrate includes a third curved portion between linear portions of adjacent two sides,
one of the linear portions of the first substrate overlaps one of the linear portions of the second substrate,
the terminal area is located between the other linear portion of the first substrate and the other linear portion of the second substrate, and
the third curved portion is shorter than the first curved portion.

7. The display device of claim 6, wherein
a light-shielding layer is formed around the display area, and
an edge of the light-shielding layer on the display area side includes a fifth curved portion opposed to the third curved portion.

8. The display device of claim 7, wherein
a width between the fifth curved portion and the third curved portion in the light-shielding layer is larger than a width between the third curved portion and the first curved portion in the terminal area.

9. The display device of claim 7, wherein
the second substrate includes a fourth curved portion opposed to the third curved portion on a diagonal line, and
a width between the fifth curved portion and the third curved portion is larger than a width between the fourth curved portion and the display area.

10. The display device of claim 7, wherein
the first substrate further includes scanning lines and signal lines in the display area, a scanning line driver located outside the display area to drive the scanning lines, and a signal line driver located outside the display area to drive the signal lines, and
a part of the scanning line driver and a part of the signal line driver are located between the fifth curved portion and the third curved portion.

11. The display device of claim 7, wherein
the first substrate further includes sensor electrodes in the display area and a sensor electrode driver driving the sensor electrodes, and
a part of the sensor electrode driver is opposed to the fifth curved portion and is covered with the light-shielding layer.

12. The display device of claim 6, wherein
the first substrate includes a second curved portion opposed to the first curved portion on a diagonal line,
the second substrate includes a fourth curved portion opposed to the third curved portion on a diagonal line, and
the fourth curved portion overlaps the second curved portion in planar view.

* * * * *